UNITED STATES PATENT OFFICE.

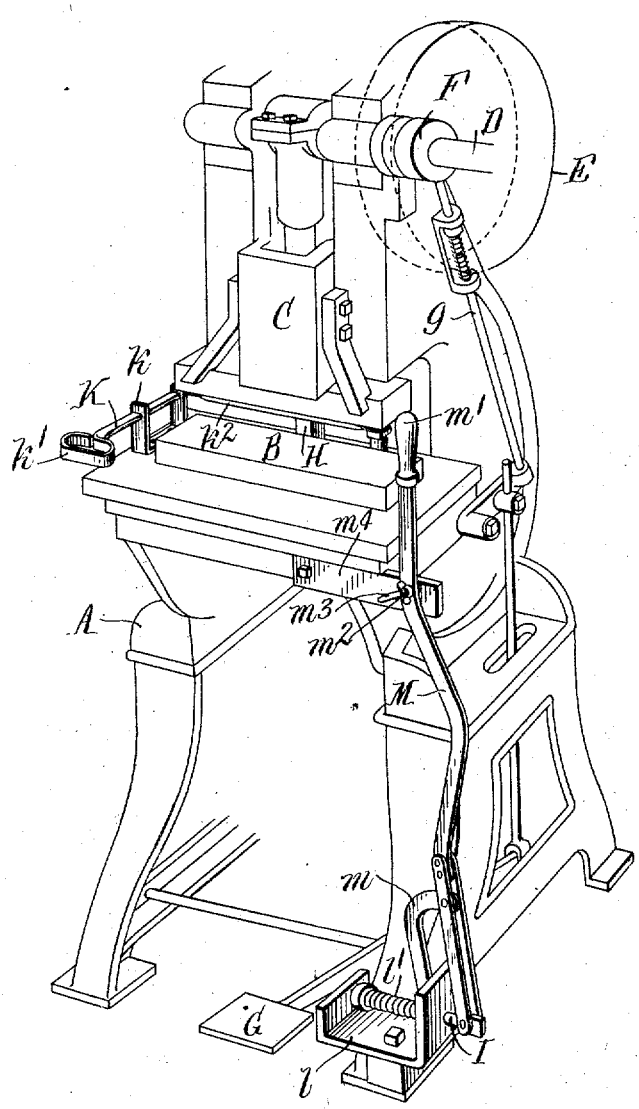

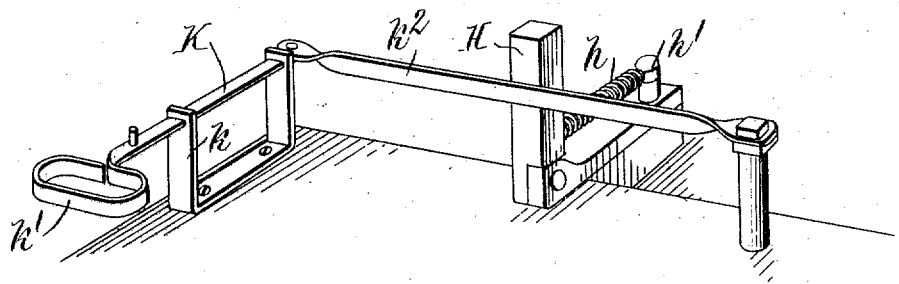
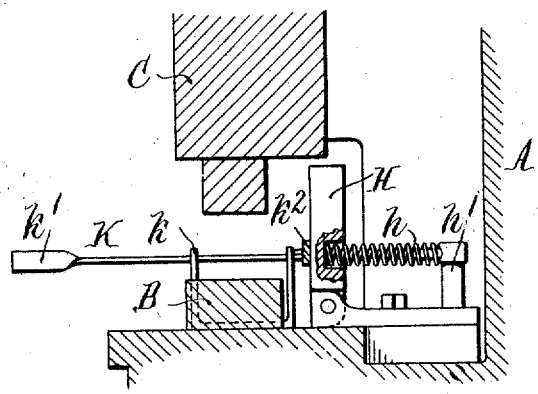
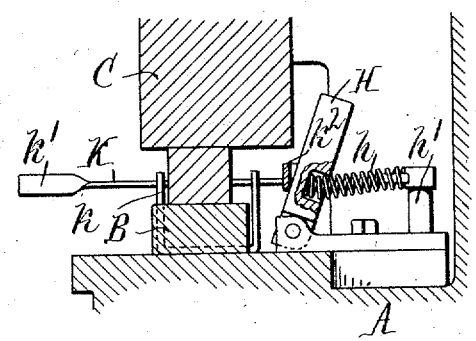
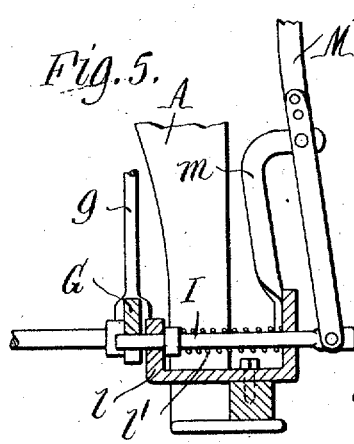

JOHN T. RONAN, OF BUFFALO, NEW YORK.

SAFETY APPLIANCE FOR PRESSES AND OTHER MACHINES.

956,422.  Specification of Letters Patent.  Patented Apr. 26, 1910.

Application filed November 23, 1908. Serial No. 464,180.

*To all whom it may concern:*

Be it known that I, JOHN T. RONAN, a citizen of the United States, residing at Buffalo, in the county of Erie and State of New York, have invented a new and useful Improvement in Safety Appliances for Presses and other Machines, of which the following is a specification.

The object of this invention is to provide a safety appliance for blanking, forming and other presses and analogous manually-controlled power driven machines, which will make it necessary for the operator to use both of his hands at points distant from the plunger, or other power-operated part of the machine, to start the machine, thus positively preventing injury to the operator's hands.

Another object of the invention is to provide a safety appliance of simple and practical construction which can be made and applied to machines at small expense, and which will not materially increase the labor of operating the machine, nor prevent the rapid operation thereof.

In the accompanying drawings, consisting of two sheets: Figure 1 is a fragmentary perspective view of a press equipped with a safety appliance embodying the invention. Fig. 2 is a fragmentary perspective view, on an enlarged scale, of the stop device for the plunger and its hand-actuating means. Fig. 3 is a fragmentary sectional elevation of the press, showing the plunger raised and the stop device in position to prevent the movement of the plunger. Fig. 4 is a similar view, showing the plunger lowered. Fig. 5 is a fragmentary front elevation, partly in section, of the treadle latch and its operating means.

Like letters of reference refer to like parts in the several figures.

A represents the frame, B the stationary die, and C the reciprocating plunger of a power-driven press. The plunger is reciprocated by an eccentric or crank shaft D which is driven by a continuously running pulley E through the medium of an automatic stop clutch F controlled by a starting treadle G and a throwout device $g$ connected to and operated by the treadle. The construction and operation of presses of this sort are well known. When the starting treadle is depressed the clutch is released and connects the crank shaft to the drive pulley so that the shaft is driven and reciprocates the plunger. When the treadle is released the clutch actuates automatically to disconnect the crank shaft from the driving pulley and stop the shaft in position to hold the plunger in its raised or rest position.

The safety appliance comprises a stop device H which is movably mounted on the press and prevents the plunger from descending from its raised or rest position unless the stop device is first moved from its holding position, and a latch or bolt I which prevents the starting treadle from being depressed to start the machine unless the latch is first retracted. The stop device and latch are operated by separate handles or devices located so that they can only be actuated by the operator grasping one with one hand and the other with his other hand.

In the construction shown in the drawings, the stop device H consists of a block pivoted at its lower end in any suitable manner on the press bed and adapted to be moved to an upright position beneath the plunger C, when the latter is raised, by a spring $h$ arranged between the block and a stationary post or part $h'$ on the press bed in rear of the block.

K is a push rod which extends fore and aft of the press at one side thereof and is slidably mounted in a suitable guide or frame $k$ secured on the press bed. The push rod is provided at its front end with a handle $k'$ and is connected at its rear end to one end of a lever $k^2$ which extends across the rear portion of the press in front of the stop block H and is pivoted at its other end in any suitable manner to the press bed. Each time the press plunger is raised the spring $h$ throws the stop block H forwardly to an upright position beneath the plunger and holds the push rod K in its forward position, as shown in Fig. 3, and the plunger cannot descend until the stop block is swung rearwardly from beneath the plunger, as shown in Fig. 4, by shoving the push rod K rearwardly.

The treadle latch I consists of a bolt which is slidably mounted in a suitable frame of guide $l$ secured on the lower portion of the press frame adjacent to the treadle, and is projected inwardly beneath the treadle when the latter is raised by a suitable spring l'.

M represents a hand lever for operating the latch I. The lever is fulcrumed on a bracket m rising from the latch frame, is connected at its lower end to the latch bolt and is provided at its upper end with a handle m' which is located at the opposite side of the press from the push rod K within easy reach of one hand of the operator. A bolt m² secured to the upper portion of the lever M and passing through a slot m³ in a plate m⁴ secured to the press frame supports the upper end of the lever and limits the throw thereof. Whenever the starting treadle G returns to its raised normal position after being depressed to start the press, the spring l' projects the inner end of the latch bolt beneath the treadle and prevents it from being again depressed without first moving the hand lever M to retract the bolt. Thus the treadle cannot be depressed to start the machine without first moving the hand lever M to release the treadle and the plunger cannot then descend unless the push rod K is operated to move the stop block from beneath the plunger. After the work has been placed in position beneath the plunger, the operator must therefore grasp and operate both the push rod K and the latch lever M before the plunger can be caused to descend, and as both hands are required to do this it is impossible for either hand to be beneath the plunger when it descends, so that injury to the hands is positively prevented. If the operator should inadvertently operate the latch lever and depress the treadle without actuating the push rod K, the plunger could not descend on account of the stop block H being beneath it, and the drive belt would slip on the pulley E, thus permitting the crank shaft to remain stationary. The latch lever and push rod are preferably located as shown, at opposite sides of the front portion of the press, where they are within easy reach of the operator's hands and can be operated together quickly and with but little exertion.

In the appliance described, a sliding rod is employed at one side of the machine for moving a stop out of the path of the plunger, and a lever at the other side for moving a latch out of engagement with the starting treadle of the press. This construction is simple and efficient, but the invention is not restricted to such construction, for manifestly other sorts of hand-actuated parts could be used for operating a plunger stop and treadle latch of the construction shown or of other construction, or other parts coöperating with operative parts of the machine for accomplishing similar ends, the essential idea of the invention being the employment of two hand-actuated devices which must be operated to start the machine and which are so located and associated that both of the operator's hands are required to operate them.

I claim as my invention:

1. The combination with a power-operated machine, of means which normally prevent the operation of the machine, and independent mechanical hand devices for operating said means, which devices are separated so that both hands are required to operate them and which must be moved at substantially the same time to actuate said means to allow the machine to be started, substantially as set forth.

2. The combination with a press or analogous machine, of separate and independent devices each of which normally prevents the operation of the machine and must be actuated to start the machine, and separate operating handles for said devices which are arranged at a distance apart so that both of the operator's hands are required to actuate said handles, substantially as set forth.

3. The combination with a machine having a power-operated part, and a starting device therefor, of a stop device which normally prevents the operative movement of said power-operated part, a latch which normally prevents the actuation of said starting device, and separate handles for moving said stop device and said latch to release the parts controlled thereby, substantially as set forth.

4. The combination with a machine having a reciprocating plunger, and a starting device therefor, of a latch which normally holds said starting device from movement, a stop device which normally prevents the operative movement of said plunger, and separate hand-operating devices connected to said latch and stop device for actuating the same, substantially as set forth.

5. The combination of a machine having a reciprocating plunger, and a starting treadle therefor, of a latch for said treadle, a stop device which is normally held in the path of said plunger, and separate hand-operating devices for said latch and stop device arranged at opposite sides of the machine within reach of the operator's hands, substantially as set forth.

6. The combination of a machine having a reciprocating plunger, and a starting treadle therefor, of a latch for said treadle, a stop block movably mounted on said machine, means for normally holding said stop block in the path of said plunger, a hand-operating device at one side of the machine for moving said stop block out of the path of said plunger, and a separate hand-operating device at the opposite side of the machine for moving said latch to release said treadle, substantially as set forth.

7. The combination of a machine having a reciprocating plunger, and a starting treadle therefor, of a latch for said treadle, a stop block movably mounted on said machine, a spring for moving said stop block into the path of said plunger, a push rod at one side of the machine and connections for moving said stop block out of the path of said plunger, and a hand lever at the opposite side of the machine for moving said latch to release said treadle, substantially as set forth.

Witness my hand, this 17th day of November, 1908.

JOHN T. RONAN.

Witnesses:
C. W. PARKER,
C. B. HORNBECK.